UNITED STATES PATENT OFFICE.

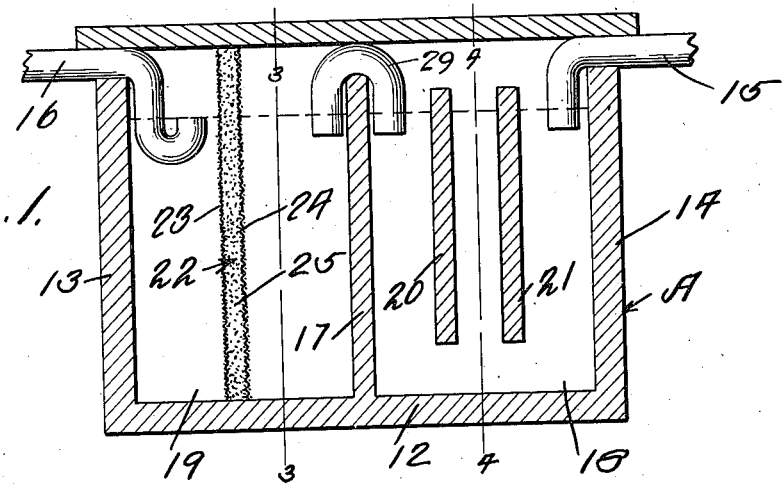
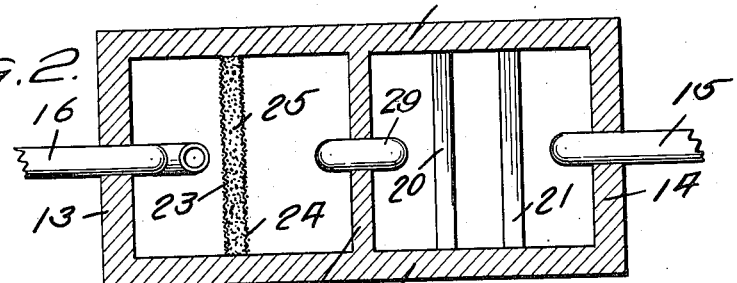
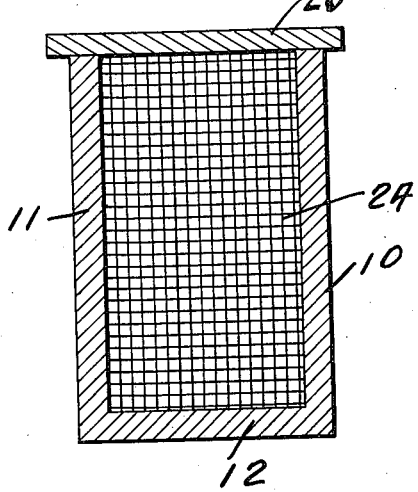
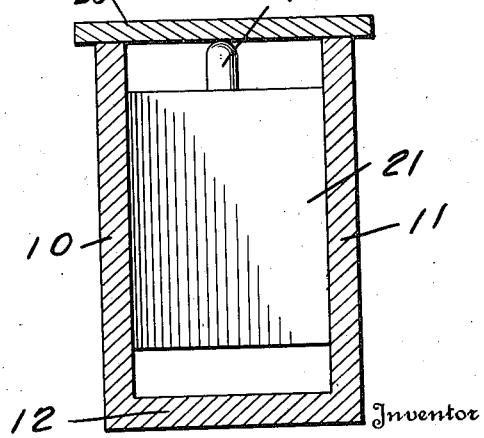

WILLIAM J. KEARNEY, OF MEMPHIS, TENNESSEE, ASSIGNOR OF ONE-HALF TO JAMES M. SPEED, OF MEMPHIS, TENNESSEE.

SEPTIC TANK.

1,179,327.  Specification of Letters Patent.  Patented Apr. 11, 1916.

Application filed August 24, 1915. Serial No. 47,184.

*To all whom it may concern:*

Be it known that I, WILLIAM J. KEARNEY, a citizen of the United States, residing at Memphis, in the county of Shelby, State of Tennessee, have invented certain new and useful Improvements in Septic Tanks; and I do hereby declare the following to be a full, clear, and exact description of the invention, such as will enable others skilled in the art to which it appertains to make and use the same.

This invention relates to septic tanks.

The object of the invention is to provide a septic tank for use in localities without a system of sewerage and which may be inexpensively manufactured and readily set up without the use of special machinery in effecting its installation.

A further object of the invention is to provide a septic tank embodying an improved construction designed to enhance the utility thereof and to render the apparatus sanitary, practical and efficient in use.

A still further object of the invention is to provide a septic tank embodying an improved construction whereby the flow of sewage therethrough is retarded and any disturbance or agitation of the sewage at the bottom of the tank prevented.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a vertical section of a septic tank constructed in accordance with the invention; Fig. 2, a plan view of the tank; Fig. 3, a section on the line 3—3 of Fig. 1, and Fig. 4, a section on the line 4—4 of Fig. 1.

Referring to the drawings the apparatus is shown as comprising a tank body A of the desired form and constructed of any suitable material, preferably concrete. This body A includes side members 10 and 11, a bottom 12 and end members 13 and 14. Sewage is delivered into one end of the tank by an inlet 15 while the purified material is discharged from the tank by an outlet 16.

The tank A is provided with a partition 17 connecting the side members 10 and 11 and rising from the bottom 12 to the upper edge of said side members. This partition 17 divides the tank into compartments 18 and 19. Disposed within the compartment 18 are partitions 20 and 21 which connect the walls 10 and 11 and have their lower and upper edges spaced from the bottom 12 and the upper edges of said members respectively. These partitions 20 and 21 are constructed preferably of concrete and are formed integral with the tank body. Disposed within the compartment 19 is a filtering partition 22 which connects the side walls 10 and 11 and extends from the bottom 12 to the upper edges of said side walls. This partition 22 is formed of spaced sheets of wire mesh 23 and 24 between which is disposed a filler of filtering material 25. The top of the tank body A is closed by a slab 26 which can be removed when desired.

In the use of the tank the sewage is delivered into the compartment 18 and the flow thereof through said compartment is retarded by the partitions 20 and 21 so as to give the solid matter and impurities opportunity to settle to the bottom of the compartment where such matter and impurities are attacked by the anaerobic bacteria. These bacteria will of course destroy all of the solid matter and impurities leaving substantially clear water which latter is conveyed to the compartment 19 by a siphon 29 mounted on the upper end of the partition 17. The water entering the compartment 19 will filter through the partition 22 and then be discharged from the outlet 16 in an absolutely pure state.

What is claimed is:—

1. In a device of the class described the combination of a tank body having an inlet and an outlet at its ends respectively, a partition in said body dividing same into compartments, a siphon mounted on said partition for conveying material from one compartment to another, spaced partitions in the compartment adjacent the inlet of the tank, said partitions having their lower and upper edges spaced from the bottom of the tank and the upper edge thereof respectively, and a filtering partition in the compartment adjacent the outlet of the tank and extending from the bottom to the upper edge of the tank.

2. In a device of the class described the combination of a tank body having an inlet and an outlet at its ends respectively, a partition in said body dividing same into compartments, a siphon mounted on said partition for conveying material from one compartment to another, spaced partitions in the compartment adjacent the inlet of the tank, said partitions having their lower and upper edges spaced from the bottom of the tank and the upper edge thereof respectively, and a filtering partition in the compartment adjacent the outlet of the tank and extending from the bottom to the upper edge of the tank, said filtering partition comprising spaced sheets of wire mesh and a filler of filtering material disposed between said sheets.

In testimony whereof, I affix my signature, in the presence of two witnesses.

WILLIAM J. KEARNEY.

Witnesses:
 IMA M. CRAIG,
 A. J. DONELSON.